United States Patent [19]

Ressler

[11] Patent Number: 5,137,413
[45] Date of Patent: Aug. 11, 1992

[54] EXPANDED INTERIOR SPACE AND IMPROVED ACCESS MINI-VAN

[76] Inventor: Paul Ressler, 2902 Victoria Cir., Apt. H2, Coconut Creek, Fla. 33066

[21] Appl. No.: 593,244

[22] Filed: Oct. 5, 1990

[51] Int. Cl.⁵ .................................................. B60P 1/43
[52] U.S. Cl. .................................. 414/474; 280/43.11; 280/43.18; 296/25; 414/537; 414/921
[58] Field of Search .................. 414/537, 921, 474; 296/25, 37.14; 14/71.1; 410/101, 102, 112, 113, 3, 4, 7, 96, 97; 280/43.11, 43.18, 704

[56] References Cited

U.S. PATENT DOCUMENTS

| | | | |
|---|---|---|---|
| 2,205,723 | 6/1940 | Hansen | 296/25 X |
| 2,536,563 | 1/1951 | Montgomery | 280/43.18 X |
| 2,577,246 | 12/1951 | Hill | 280/43.11 X |
| 3,338,620 | 8/1967 | Cauvin | 296/37.14 |
| 3,941,261 | 3/1976 | Ricci | 414/537 |
| 4,847,972 | 7/1989 | Anderson et al. | 414/921 X |
| 4,898,508 | 2/1990 | Hayata | 414/921 X |
| 4,966,392 | 10/1990 | Featon et al. | 410/7 X |

FOREIGN PATENT DOCUMENTS

| | | | |
|---|---|---|---|
| 390431 | 10/1990 | European Pat. Off. | 414/537 |
| 2359649 | 6/1975 | Fed. Rep. of Germany | 410/3 |
| 2628736 | 1/1977 | Fed. Rep. of Germany | 414/921 |
| 2598362 | 11/1977 | France | 414/921 |
| 263847 | 11/1986 | Japan | 296/37.14 |
| 38060 | 5/1936 | Netherlands | 410/7 |
| 146421 | 7/1931 | Switzerland | 296/37.14 |

OTHER PUBLICATIONS 4 pages of Dodge Plymouth Kneelkar Catalog.

Primary Examiner—David A. Bucci
Attorney, Agent, or Firm—Malin, Haley, McHale, DiMaggio & Crosby

[57] ABSTRACT

An improvement in a vehicle such as a mini-van for transporting wheel chair bound people or large and bulky items is disclosed. A mini-van having a rear dropped axle and a door openable to the rear of the mini-van is converted into the improved mini-van. The improved mini-van is able to transport passengers or cargo as do ordinary mini-vans, and in addition may be quickly and easily converted to either simultaneously carry a wheelchair or bulky item and passengers if desired. The improved mini-van has a drop floor, a rear body piece having a cut-out section corresponding to the drop floor, a pivoting ramp for providing access to the drop floor, and a system for lowering the mini-van to make it more accessible to wheelchair bound people or easier to load bulky objects. The improved mini-van also includes a system for securing the wheelchair or bulky item within the mini-van. In addition, a removable covering for the drop floor is disclosed.

18 Claims, 5 Drawing Sheets

EXPANDED INTERIOR SPACE AND IMPROVED ACCESS MINI-VAN

BACKGROUND OF THE INVENTION

1. Field of the Invention

The invention relates to mini-vans and more particularly to mini-vans which have expanded interior space and improved access which are particularly adapted to receive wheel chair bound persons or large and bulky items and which are created by modifying existing passenger mini-vans having front wheel drive and a dropped rear axle.

2. Description of Related Art

Numerous vans capable of carrying wheel chairs and the like are known in the prior art. Presently there are several styles of wheel chair accessible mini-vans with drop floors between the front and rear axles. Exemplary of these types of vans are the WHEEL CHAIR CARRYING MINI BUS, U.S. Pat. No. 3,941,261, issued to Ricci on Mar. 2, 1976 and VAN APPARATUS FOR HANDICAPPED PEOPLE AND A METHOD OF MAKING SAME, U.S. Pat. No. 4,847,972, issued to Anderson et al. on Jul. 18, 1989.

In addition, there are several styles of mini-vans without drop floors but which have raised roofs to supply sufficient head room for the wheel chair bound person. Either of these two types of vehicles typically have either ramps or lifts which allow access to the interior of the vehicles usually through a side door.

SUMMARY OF THE INVENTION

This invention provides an inexpensive vehicle especially adapted to transport people in wheel chairs or bulky objects while simultaneously carrying up to five passengers. However, the instant invention is readily adaptable to function as an ordinary passenger mini-van capable of holding up to seven passengers comfortably and safely. The instant invention comprises a modification to an ordinary passenger mini-van having front wheel drive and a dropped rear axle such as the Dodge Caravan and Plymouth Voyager.

In accordance with the teachings of this invention, the ordinary passenger mini-van retains its ability to serve as a passenger mini-van while at the same time becoming readily adaptable to safely transport a wheel chair bound person or a large bulky transportable item.

In summary, a section of the original floor panel between the frame rails is removed. A drop floor is placed at a lower elevation between the frame rails. The drop floor is supported by channel metal supports welded to the frame rails. An access area is formed, bounded on the bottom by the drop floor, and on the sides and front by metal sheets. These metal sheets are welded at their bottom edges to the drop floor and at their top edges to the frame rails and edges of the original floor panel.

A section of the rear bumper and body of the mini-van corresponding in width to the drop floor is removed allowing access to the access area from the rear of the mini-van. This resulting access is in addition to the access provided to the interior of the mini-van through the original rear door which opens around a pivot on its upper edge in connection with the top rear edge of the mini-van body.

A ramp, corresponding in width to the drop floor, which pivots around its connection to the drop is provided. The ramp pivots from a storage position substantially vertical and inside the body of the mini-van to a functional position where the non-pivoting edge is in contact with the ground. This allows wheel chairs or other wheeled items to move up the ramp into the access area from the rear of the mini-van.

A winch and cable system is provided which pulls the frame of the mini-van toward the rear dropped axle thereby decreasing the angle of the ramp with the ground when the ramp is in its functional position. This decreased angle makes it easier for wheel chairs and other wheeled items to traverse the ramp into the access area.

A strap system is provided which attaches at one end to the existing seat mounts in the mini-van and at the other end in a crossed manner to the wheel chair or other item to be secured.

A replacement floor panel is provided which covers the access area when its use is not required. The replacement floor panel provides a virtually identical floor surface to the original floor panel before a portion of it was removed to create the access area.

The instant invention not only finds great utility in its use by people who are wheel chair bound and their family and friends, but is also readily and easily adaptable to be used by taxicab and rental car companies. This is because prior to the instant invention, custom created vehicles were needed to serve the transportation needs of handicapped people. These custom created vehicles typically involved lifting the handicapped person, typically by the use of hydraulics, and are quite expensive and difficult to build and maintain. In particular, maintenance of the hydraulics of the prior art vehicles has been found to be difficult and expensive.

In addition, the use of these prior art vehicle was virtually limited exclusively to the transport of wheel chair bound people. Because of the limited demand for such expensive vehicles, companies such as taxicab and rental car companies were unwilling to make the capital expenditure to secure large numbers of such vehicles which had limited utility.

By contrast, the instant invention, in comparison to such custom creations, requires relatively little modification. At the completion of the relatively inexpensive modification, the mini-van, with the insertion of the replacement floor panel and the replacement of the original bench passenger seats is virtually identical in function and appearance to the original unconverted mini-van. However, if the need arises to transport a handicapped person or to transport bulky objects, the seats and replacement floor panel can be readily removed and stored thereby providing access for the wheel chair bound person or the large bulky object. In this way, a vehicle easily and readily adapted to these two uses is available to customers.

Having briefly described the instant invention, the invention will be described in detail with reference to the accompanying drawings where like elements are referred to by like numerals.

DETAILED DESCRIPTION OF THE INVENTION

Figure 1:
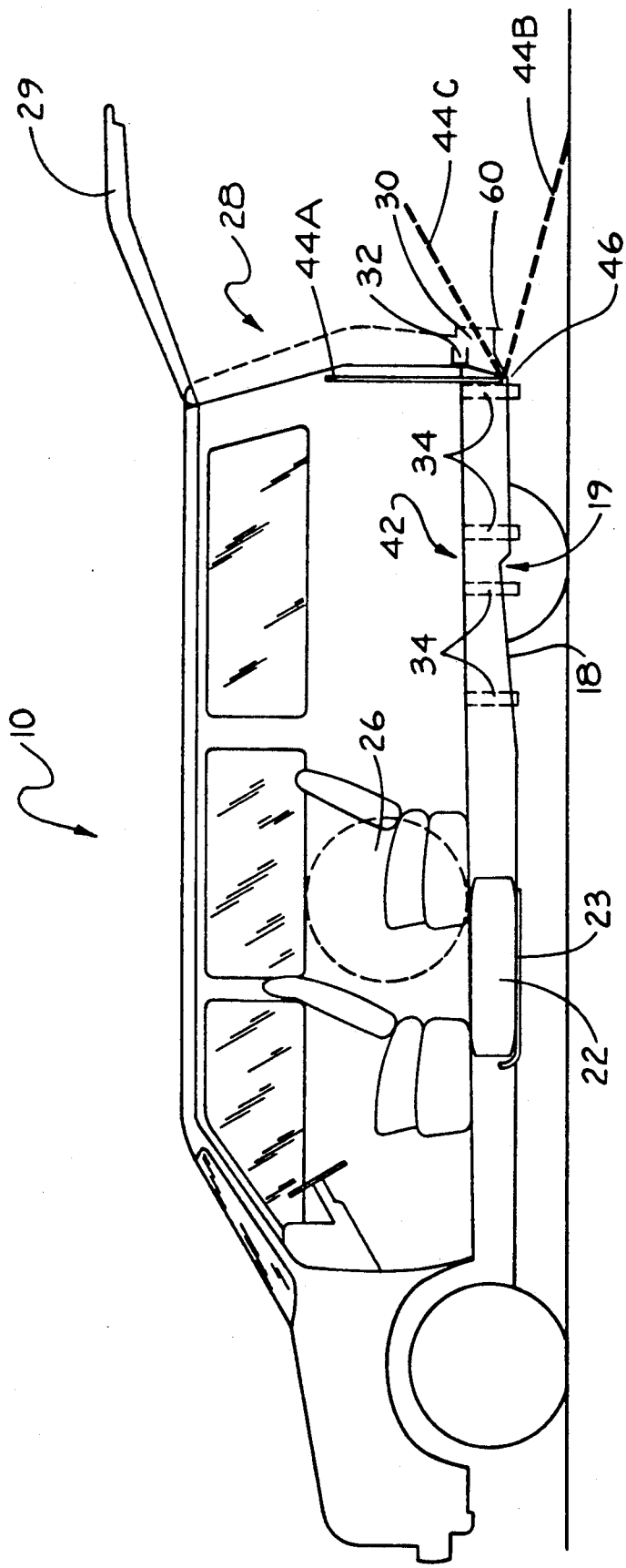
FIG. 1 is a side cross-section view of the instant invention.
Figure 2:
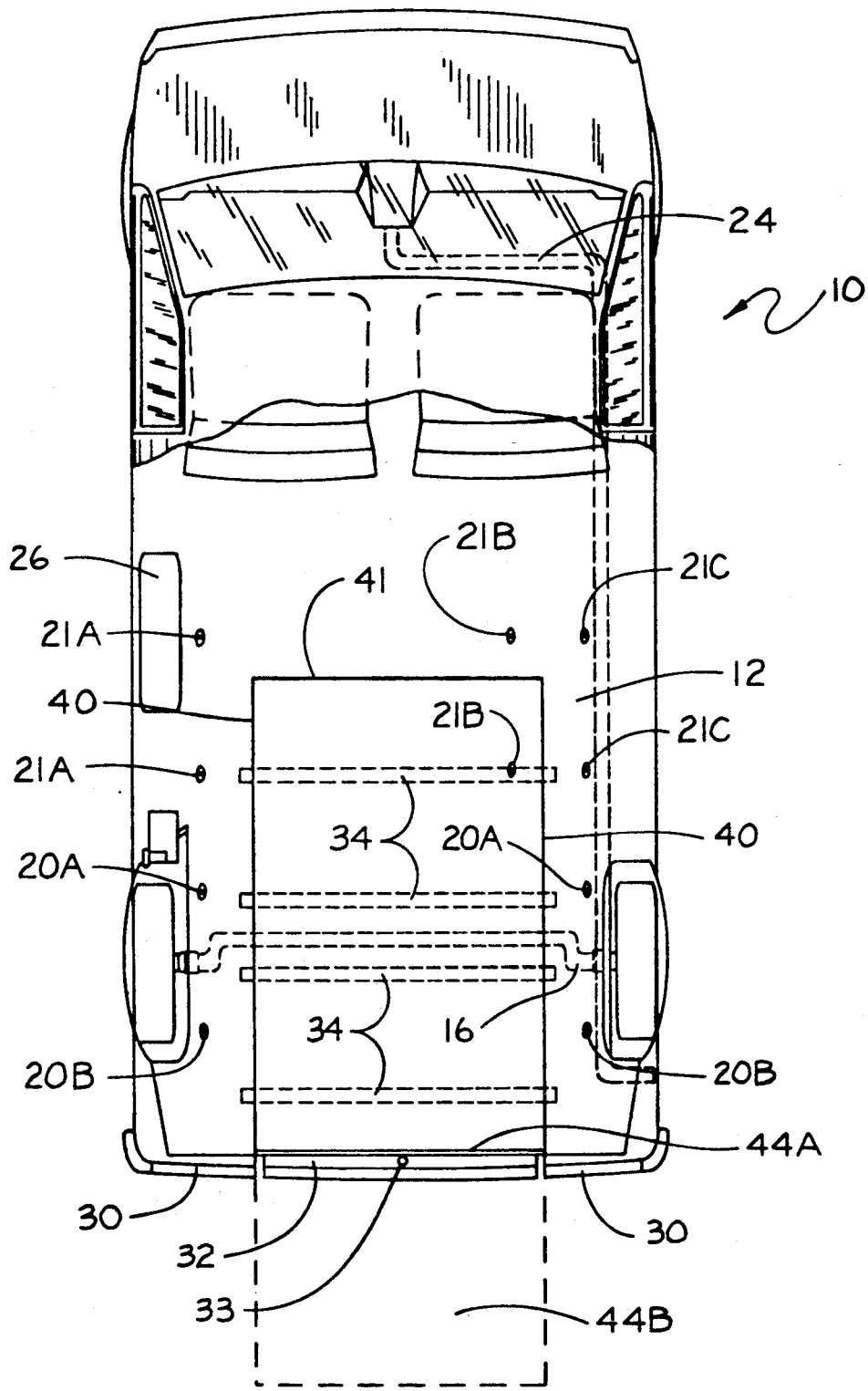
FIG. 2 is a plan view of the invention shown in FIG. 1 with the roof of the mini-van removed.
Figure 3:
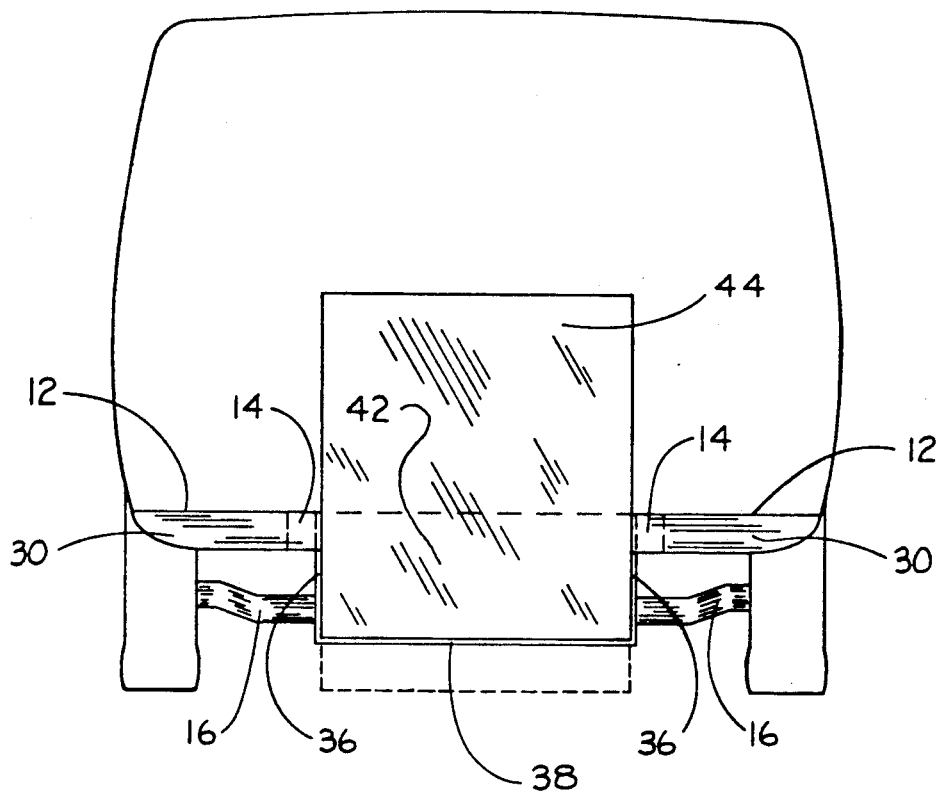
FIG. 3 is a rear view of the invention of FIG. 1.

The conversion process from a stock mini-van involves removing a section of the floor panel 12 between the frame rails 14 of the mini-van 10 above the rear dropped axle 16. As shown in FIGS. 1-3, a drop floor 18, preferably about 32 inches wide, made of 16 gauge sheet steel is placed below the original floor panel 12 in the space created by the removal of the initial floor panel 12. This new drop floor 18 is substantially horizontal and has a width sufficient to allow a wheel chair to be safely placed thereon. Because the drop floor 18 is placed between the frame rails 14 of the mini-van 10, the width of this drop floor 18 does not extend to the entire width of the original floor panel 12. This allows the original seat mounts 20 to be retained in their original positions along the outer edges of the floor panel 12.

The introduction of this new drop floor 18 requires the relocation of the gas tank 22, the exhaust system 24 and spare tire 26 which, in the case of a Dodge Caravan, are placed under the original floor panel 12. It has been found that the gas tank 22 is ideally moved from below the original floor panel 12 above the dropped axle 16 to a position nine inches forward of the drop floor 18. Ideally, this relocated gas tank 22 is protected by placing a protection sheet 23 of steel beneath it. The muffler and exhaust pipes of the exhaust system 24 are relocated from their original position in the center of the vehicle to a location along either side of the mini-van 10 around the relocated gas tank 22. Also, the spare tire 26 is preferably moved from below the original floor panel 12 near the rear of the vehicle to a position inside the vehicle between the left side of the forward bench seat and the left wall of the vehicle.

The relocation of the spare tire 26 and the removal of floor panel 12 above drop floor 18, in the case of the Dodge Caravan, requires a modification to the front passenger bench seat. The forward bench seat in the seven passenger configuration is a two passenger seat mounted to the floor panel 12 through seat mounts 21A and 21B. Seat mounts 21A are located along the left side of floor panel 12 in alignment with the left side seat mounts 20 A,B of the rear passenger seat. Seat mounts 21 B are located to the right of the center of floor panel 12 but inside of seat mounts 21 C which are located along the right side of floor panel 12 and in alignment with the right seat mounts 20 A,B of the rear passenger seat. Because the front passenger seat is a two passenger seat instead of the three passenger seat of the rear passenger seat, the seat mounts 21 B are required to mount the front seat in the original configuration. By design, the front passenger seat may be removed and the rear passenger seat moved forward where it may be attached to seat mounts 21A on the left side and 21 C on the right.

When the spare tire 26 is relocated to its new location inside the interior of mini-van 10 to the left of the front passenger seat, the spare tire extends into the space previously occupied by the front seat. Also, with the removal of floor panel 12 above the drop floor 18, the rearmost of seat mounts 21 B (shown in phantom in FIG. 2) is also removed. This necessitates the movement of the front seat to the right and its modification to be mounted to seat mounts 21 A and 21 C. This is accomplished by moving the left side leg fixture from its original location inboard of the left side of the front seat to a new location along the outer edge of the seat. This left fixture is moved a sufficient distance to allow the right leg fixture of the front seat to be attached to seat mount 21 C while allowing the left leg fixture to be attached to seat mount 21 A.

Left leg fixture is moved by unbolting it from its original position and re-bolting it to its new position as described above.

An added benefit of this modification is that the front and rear bench seats may now be exchanged in their positions, if desired, so that specific interior configurations may be created or the inherent characteristics or features of each seat type may be utilized as desired by the mini-van's users.

The drop floor 18 does not have a uniform depth along its entire length. Instead, there is a small hump 19 above the rear dropped axle 16. This hump 19 has a height of about 2 inches. The drop floor 18 extending from the rear of the mini-van 10 to the hump 19 has a depth below the floor panel 12 of about 7 inches. From the top of the hump 19 forward to the front piece 41, the drop floor 18 descends from a depth at the hump 19 of 5 inches below the floor panel 12 to 7 inches below the floor panel 12 at the front piece 41. This hump allows the rear dropped axle 16 to avoid contacting the bottom of the drop floor 18 when the mini-van 10 goes over bumps when moving or when the frame 14 of the mini-van 10 is lowered to the ground by the winch 60 as will be described hereafter. In addition, the gradual slope of the drop floor 18 from the hump 19 to the front piece 41 hinders the wheel chair 71 or other bulky item from moving forward or backward in the access area 42, unexpectedly in response to movement of the mini-van 10.

The drop floor 18 extends forward from the rear of the vehicle preferably a distance of 60 inches. In the Dodge Caravan, this means that the drop floor ends below the forwardmost passenger bench seat. In order to access this drop floor from the rear of the vehicle through the rear entrance 28 of the mini-van 10, a portion of the bumper 30 and body corresponding in width to the drop floor 18 must be removed.

the drop floor 18 is attached to the frame rails 14 and held in place by channel brackets 34 which form a skeletal cradle for the drop floor 18. Each channel bracket 34 comprises a pair of channel pieces 36 welded to the frame rails 14 and extending downward. A horizontal piece 38 is welded to the downward extending channel pieces 36 at a level to support the drop floor 18. A plurality of these channel brackets 34 forms the skeletal structure of the drop floor 18.

The drop floor 18 is then welded to the horizontal channel pieces 38 to securely hold it in place. Side pieces 40 and a front piece 41, also made of 16 gauge sheet steel, are welded to the drop floor 18 at their lower edges and to the frame rails 14 of the mini-van 10 at their upper edges to define an enlarged access area 42 within the body of the mini-van 10.

A horizontally pivoting ramp 44 is attached to the rear edge of the drop floor 18 along a ramp hinge 46. This ramp 44 is preferably made of ¼ inch diamond plate aluminum. As best shown in FIG. 1, this rotatable ramp 44 moves from a storage position 44a which is substantially vertically disposed, to a functional position 44b where the edge of the ramp farthest from the ramp hinge 46 is in contact with the ground. The ramp 44 is shown in an intermediate position at 44c. The rear edge of the drop floor 18, and the corresponding ramp hinge 46, are located so that when the ramp 44 is folded into its vertical storage position 44a, the ordinary rear door 29 of the van 10, which pivots around a pivot point at the top of the vehicle compartment, will still move down to its ordinary closed position with the body of the mini-van 10.

In this configuration, the ramp 44 will be stored within the body of the mini-van 10. However, because of the removal of the portion of the rear bumper 30 and body 31 of the mini-van 10 to allow access to the access area 42, and because the original rear door 29 of the van 10 extends only down to the top of the bumper 30, a portion of the vehicle ramp 44 in the storage position 44a as well as the drop floor 18 itself extends a distance below the original floor panel 12 of the mini-van 10 and is exposed to the outside. Therefore, an appropriate weather sealing material such as foam rubber molding or the like must be added at points of contact between the ramp 44, drop floor 18, and original rear door 29 to keep out intrusion of foreign objects and the elements from the interior of the mini-van 10.

Figure 8:
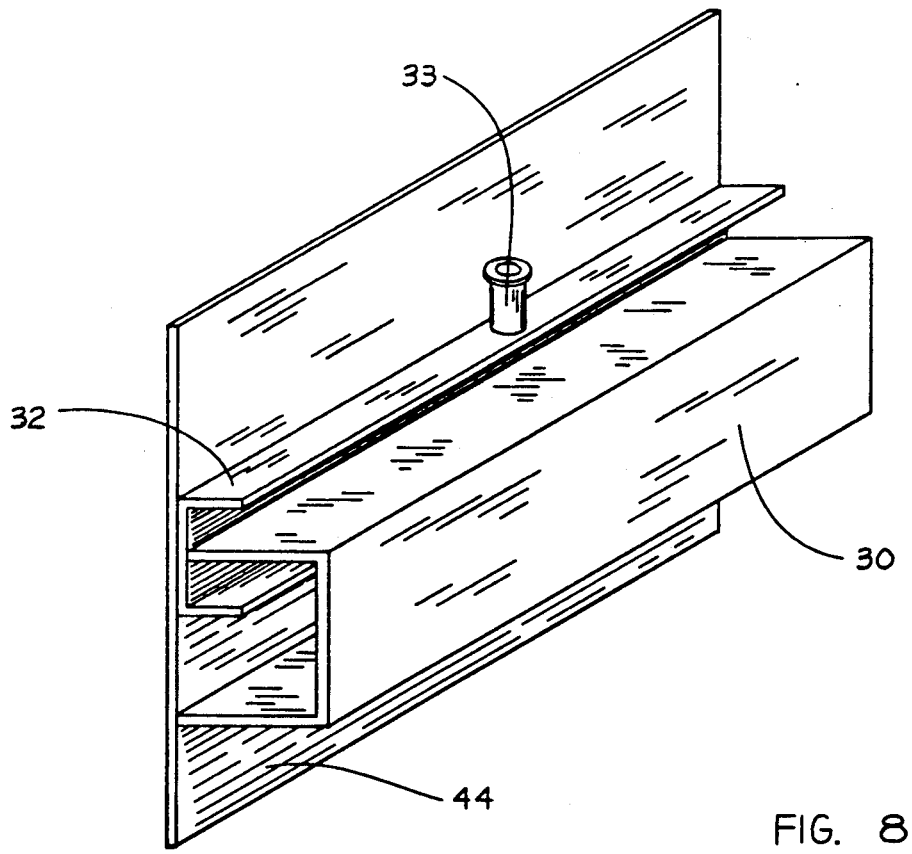
FIG. 8 is a perspective view of the latch mount and bumper attached to the ramp.

In order to improve the aesthetic appearance of the ramp 44, the section of the bumper 30 removed to create the access to the access chamber 42 is attached to the outside of the ramp 44 (FIG. 8). Therefore, when the ramp 44 is in its storage position 44a this section of bumper 30 presents the appearance of a near-continuous rear bumper 30 across the rear of mini-van 10. This near-continuous bumper 30 belies the presence of the access area 42.

In order to allow the existing rear door 29 of the mini-van 10 to lock with the modification of the instant invention, a latch mount 32 comprising a 2 inch by 2 inch channel beam is attached to the ramp 44. The protruding edges of the channel beam of latch mount 32 extend away from the ramp 44. Bumper 30 is attached to ramp 44 over one of the protruding latch edges of latch mount 32 so that the uppermost protruding edge of latch mount 32 extends over the top of bumper 30 which is attached to ramp 44. A latch 33 corresponding to the original mount which mates with the existing latch on rear door 29 is attached to latch mount 32 so that rear door 29 will be securely latched to ramp 44 by the interaction of latch 33 and the latch of rear door 29.

Figure 7:
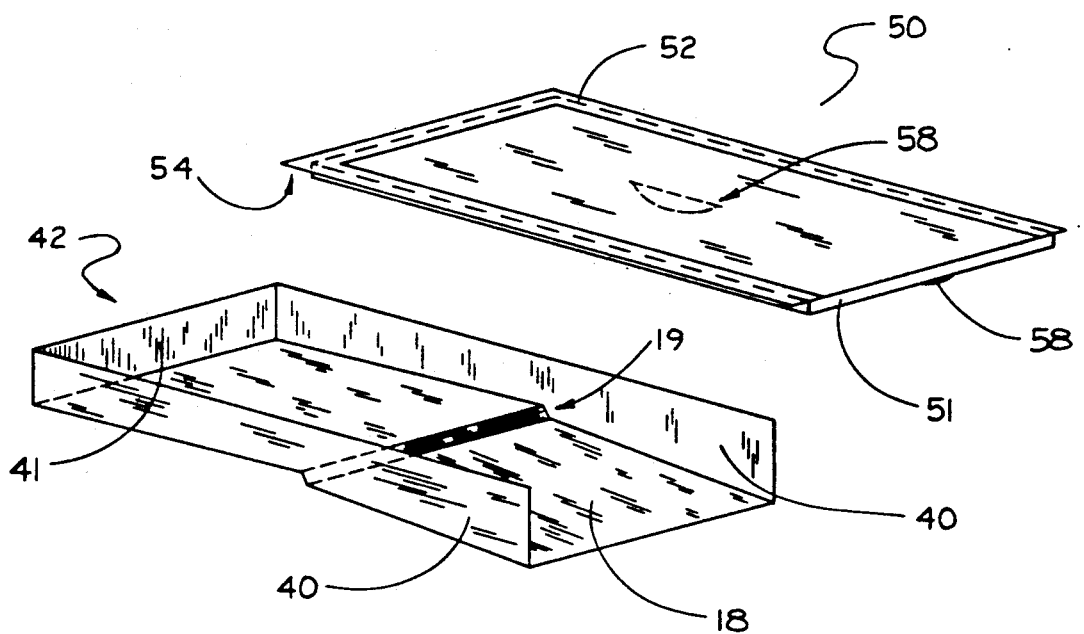
FIG. 7 is a perspective view of the replacement floor cover and its orientation with respect to the access area.

A replacement floor panel 50 (FIG. 7) is provided which nests within the access area 42 created by the drop floor 18 and forms a virtually flush surface with the original floor panel 12. This replacement floor panel 50 comprises, in the preferred embodiment, a plywood section 51 with slightly smaller dimensions than the drop floor 18. Sheet metal strips 52 are attached by screws to the top edge of the plywood 51 when the plywood 51 is laid flat. These strips 52 extend outward from the edges of the plywood 51 and form a lip 54 which rests on the floor panel 12 of the mini-van 10 while the plywood 51 is positioned above and covers the drop floor 18. Both plywood 51 and metal strips 52 are preferably covered with carpet matching the floor carpeting of the mini-van 10 to protect the replacement floor panel 50 and the interior of the mini-van 10 and to improve the visual appearance of the replacement floor panel 50.

A handle 58 is also attached to the replacement floor panel 50 on the underside or access area 42 directed side of the replacement floor panel 50 and near the rear of the replacement floor panel 50 to facilitate moving and positioning the replacement floor panel 50. This handle 58 is on the underside to keep it from becoming an obstruction in the interior of the mini-van 10 and to allow the replacement floor panel 50 to be grasped and removed from the rear of the mini-van 10.

In an alternate embodiment, the replacement floor panel 50 is supported by supports placed around the interior surface of the access area 42 on the side pieces 40 and front piece 41. In all other respects, this alternate embodiment of the replacement floor panel 50 is identical to the preferred embodiment. In either case, when the replacement floor panel 50 is in place above the access area 42, a surface substantially identical to the original floor panel 12 is presented.

In the original mini-van 10, two bench seats are provided for passengers, one behind the other. These seats are detachable from their seat mounts 20. Since the original seat mounts 20 remain in place despite the addition of the access area 42, after the modifications of the invention are made, the original seats may be replaced in their original position in the van 10. Because of the presence of the replacement floor panel 50, a virtually identical interior space to the original unconverted van, including the possibility of placing or removing the bench passenger seats in the interior space of the mini-van 10 is provided.

When access to the drop floor 18 is required, the original detachable bench seats may be detached from their seat mounts 20, and removed from the interior of the van. This exposes the replacement floor panel 50 which may then be removed by means of the handle 58. Once the replacement floor panel 50 is removed, the drop floor 18 may be accessed through the rear entrance 28 of the mini-van 10 by raising the rear door 29 and rotating the ramp 44 into contact with the ground.

Although the ramp 44 in this configuration provides access to the drop floor 18 of the van 10, it has been found that it is often desirable to bring the body of the mini-van 10 closer to the ground in order to decrease the angle of the ramp 44 to the ground. It is particularly important to decrease this angle to make it easier for a wheel chair to enter the access area 42 of the mini-van 10.

Figure 4:
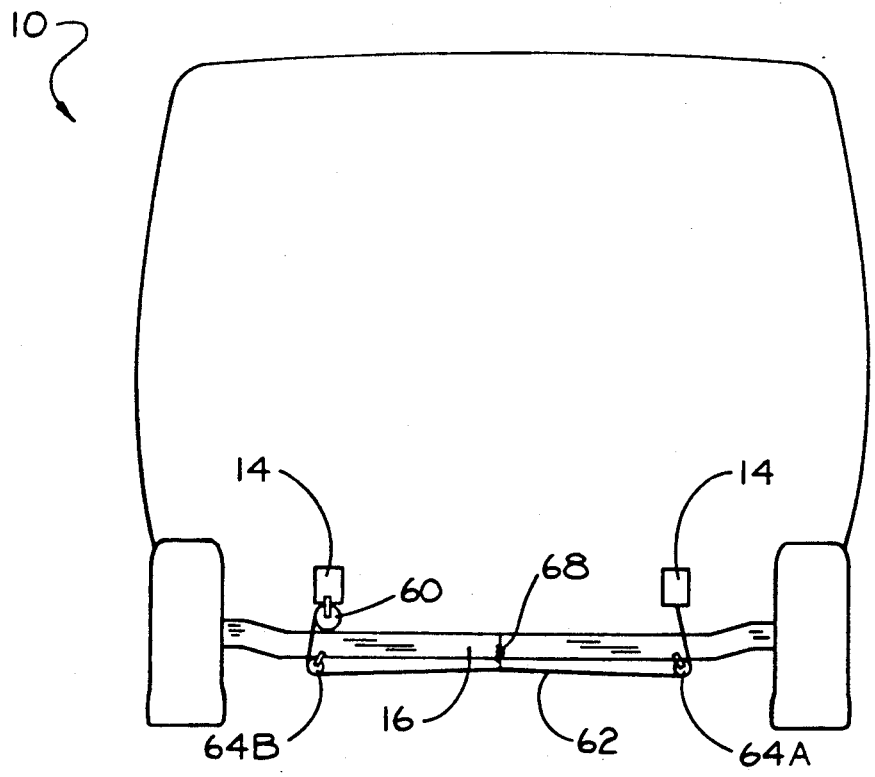
FIG. 4 is a schematic view of the invention just behind the rear dropped axle showing the winch and cable assembly.

As shown in FIG. 4, this is preferentially done by means of an electric winch 60 and line assembly which pulls the vehicle frame 14 towards the dropped rear axle 16, thereby lowering the vehicle. A steel cable 62 is securely attached to the frame rails 14 of the mini-van 10 above one side of the rear dropped axle 16. This steel cable 62 extends downward from the frame rails 14 under a pulley 64a attached to the rear dropped axle 16 of the vehicle. The cable 62 then extends from this pulley 64a to a corresponding pulley 64b similarly located on the opposite side of the rear dropped axle 16. The cable 62 then extends upward to an electric winch 60 attached to the frame rail 14 of the mini-van 10. The winch 60 is controllable from a switch not shown located either in the cab of the vehicle or on the outside of the vehicle near the rear door 29. In order to take up any slack that may appear in the steel cable between the pulleys 64a, b, a coil spring 68 is attached at one end to the center of the rear dropped axle 16 and attached at the other end to the steel cable so that the cable 62 may pass through its connection to the spring 68. In this way, the spring 68 lifts and supports the cable 62 while still allowing it to move as it is wound and unwound around the winch 60.

When the winch 60 is activated, the steel cable 62 is wound around the drum of the winch 60. This shortens the length of the cable 62, thereby drawing the frame 19 of the vehicle down towards the rear dropped axle 16. This has the effect of lowering the vehicle toward the ground and decreasing the angle of the ramp 44 from the ground to the drop floor.

Figure 5:
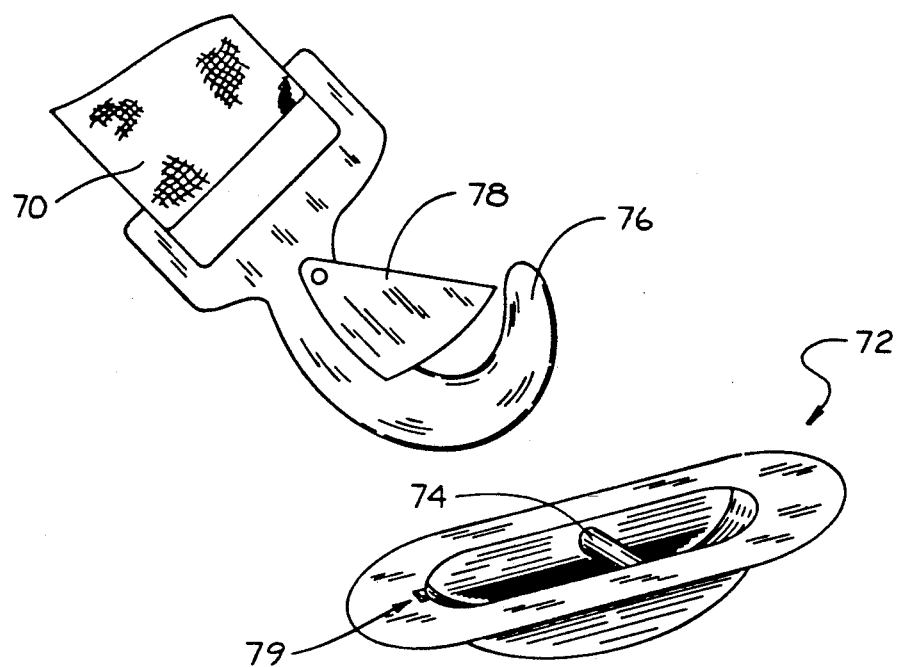
FIG. 5 is a perspective view of the recessed channel and straps of the invention.
Figure 6:
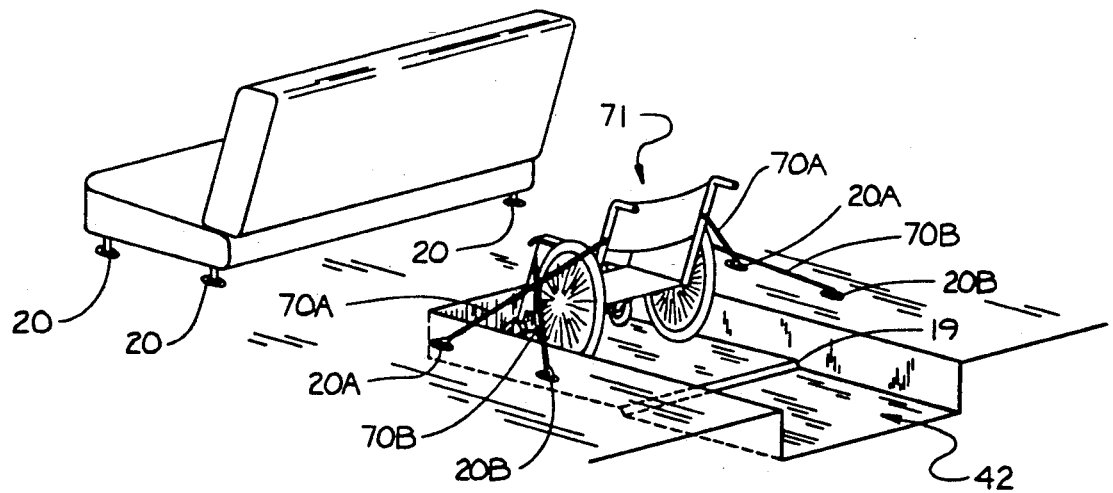
FIG. 6 is a perspective view of the straps of the instant invention connecting a wheel chair in the access area to the seat mounts.

Once the vehicle has been lowered through the use of the electric winch 60 as mentioned above, and the rearmost bench passenger seat and replacement floor panel 50 removed, the wheel chair bound person or the large transportable object may travel up the ramp 44 into the access area 42 of the vehicle. There, in the case of wheel chair bound people, as required by federal regulations, the wheel chair must be secured to the vehicle to provide safety to the wheel chair occupant and riders in the mini-van. As shown in FIGS. 5 and 6, this is preferentially done by means of straps 70 rigidly attached to the wheel chair and extending to the original rear bench seat mounts 20, which due to the removal of the rearmost bench seat, are now exposed to the interior of the mini-van.

As shown in FIG. 5, these original seat mounts 20 have a recessed channel 72 opened toward the interior of the mini-van 10 with a horizontal pin 74 extending across the channel 72. The straps 70 have a hook 76 and hasp 78 closure which hook 76 fits inside the channel 72 and attaches around the horizontal pin 74. The hasp 78 moves into contact with the hook 76 and prevents it from accidentally disengaging the horizontal pin 74, particularly when the straps 70 are loose prior to or just after the attachment or detachment respectively of the straps 70 to the wheel chair. Depending on the relative size of the hook 76 and channel 72, a small notch 79 may have to be cut into the channel to allow the hook 76 to rotate around the horizontal pin 74 into a locking engagement.

It has been found that by crossing these straps 70 (FIG. 6) so that a strap 70a attached to the rear of the wheel chair 71 is attached to the pin 74 of the front seat mount 20a of the rearmost passenger seat while the strap 70b attached to the front of the wheel chair 71 is attached to the pin 74 of the rear seat mount 20b of the rearmost passenger seat, for both sides of the wheel chair 71 respectively, a secure and stable platform is provided for holding the wheel chair 71 in position within the mini-van 10. Thereafter, the straps 70 may be adjustably tightened by means of a friction biased adjustable loop 70c such as is common in such fasteners so that the wheel chair 71 may be securely held in position.

While the instant invention has been described primarily in connection with the transportation of a wheel chair bound person, the invention is also readily adaptable for transport of large and bulky objects which were heretofore untransportable in such mini-vans. For example, as the drop floor 18 increases the distance from the top of a vehicle to the lower surface in the mini-van, it is possible to transport such diverse items as large kitchen appliances, motorcycles, or copy machines within the mini-van 10 which were previously untransportable due to their excessive weight and bulk and the difficulties involved in placing and removing them from the interior of the mini-van through the original entrances. In addition, the access to the interior of the mini-van created by the ramp and removed sections of the body and bumper allow these types of items to be easily placed within the mini-van without the use of expensive hydraulic lifting devices such as has been previously used.

When it is desired to transport such items, the drop floor 18 is accessed as described above in connection with the wheel chair by removing at least the rear bench seat and replacement floor panel 50. The ramp 44 is rotated from its storage position 44a to a position in contact with the ground 44b. The bulky device may be either wheeled up the ramp 44 by its own wheels, or a lift truck or dolly may be provided to roll the object into the access area 42 created by the drop floor 18. Thereafter the device of interest may be secured to the mini-van 10 by the use of the straps 70 placed around the item and attached to the seat mounts 20a, b as described above.

While the instant invention has been described in connection with a specific embodiment, it is to be understood that the description has been given by means of example only and not for limitation. It is clear that changes and modifications may be made to the description and still be within the scope of the invention. Further, obvious changes and modifications will occur to one skilled in the art.

What I claim is:

1. An improvement in a vehicle such as a mini-van for transporting wheel chair bound people or large and bulky items, each having a frontmost portion and rearmost portion, said mini-van having a front, a rear, and left and right outer edges, and outermost left and right horizontal dimensions said outer edges being the outermost left and right horizontal dimensions, respectively, of said mini-van, said mini-van having an original floor panel within said mini-van and at least a drivers seat, said mini-van also including a frame including at least a pair of parallel frame pieces extending from said front of said mini-van to said rear of said mini-van, said frame pieces generally located toward said outer edges of said mini-van, said vehicle having a rear dropped axle, and a rear door and rear door opening openable to said rear of said mini-van, said improvement comprising:

(a) a drop floor, located below said original floor panel of said vehicle, said drop floor located between said frame rails of said vehicle and above said rear dropped axle of said vehicle, said drop floor extending from said rear of said mini-van into a passenger or cargo compartment of said vehicle, said drop floor ending behind said driver seat of said vehicle, said drop floor located below a cutout section of said original floor panel corresponding in dimensions to said drop floor;

(b) means for connecting said drop floor to said original floor panel;

(c) a rear body piece having a cut-out portion corresponding in width to said drop floor and extending from said drop floor upward to the opening created by said rear door;

(d) a ramp pivotally connected to said drop floor at the edge of said drop floor at said rear of said vehicle, said ramp pivoting from a substantially vertical storage position within said vehicle to a functional position in contact with an external environment behind said vehicle through said cut-out portion of said rear body piece thereby providing access for a wheeled item to said drop floor through said cut-out portion of said rear body piece of said vehicle;

(e) a first pulley attached to said rear dropped axle near said parallel frame piece closest to either said left or said right outer edge, said first pulley rotating around an axis parallel to said parallel frame pieces;

(f) a second pulley attached to said rear dropped axle near said parallel frame piece closest to the opposite said right or said left outer edge from said outer edge corresponding to said first pulley, said second pulley rotating around an axis parallel to said parallel frame pieces;

(g) means, attached to said mini-van substantially above said second pulley, for pulling a cable extending from said means for pulling around said second pulley, from said second pulley around said first pulley, and from said first pulley to an anchoring position on said mini-van substantially above said first pulley where said cable is securely fastened to said mini-van whereby said means for pulling pulls said cable causing said cable to be shortened, thereby drawing said parallel frame pieces towards said first and second pulleys thereby lowering said drop floor.

2. The improvement as claimed in claim 1 wherein said means for connecting said drop floor to said original floor panel comprises:

side pieces connecting their respective left and right sides of said drop floor with corresponding sides of said original floor panel where said original floor panel has been cut out in corresponding dimensions to said drop floor.

3. The improvement of claim 2, further comprising:

a front piece connecting the edge of said drop floor closest to said front of said mini-van to said original floor panel where said original floor panel has been cut out corresponding to an edge of said drop closest to said front of said mini-van.

4. The improvement of claim 1, further comprising:

a rear bumper having a cut-out section above said drop floor and said cut-out portion of said rear body whereby removing the rear body piece and the rear bumper section located above said drop floor creates access to said drop floor through the rear of said vehicle.

5. The improvement of claim 1, further comprising: means for securely positioning a wheelchair or other large bulky item upon said drop floor.

6. The improvement of claim 5, wherein said mini-van includes means, attached to said original floor panel of said mini-van, for attaching seats within said mini-van to said original floor panel, and, wherein said means for securely positioning a wheelchair comprises:

a plurality of straps, each strap having a first end and a second end, said first end of said straps attached to the wheelchair or other large bulky item and having at said second end of each strap, means for attaching said strap to said means for attaching seats, said straps further having means for adjusting their respective lengths to tighten said straps thereby holding said wheelchair or said bulky item in position above said drop floor.

7. The improvement of claim 6, wherein said means for attaching seats comprises a plurality of troughs recessed in said original floor panel essentially level with said original floor panel, said troughs each having a lowermost portion and extending essentially parallel to said parallel frame pieces, said troughs including a pin extending across each of said troughs and located a distance above the lowermost portion of each of said troughs so that connectors on said seats corresponding to said troughs may be positioned around said pin within said trough thereby holding said seat in position above said original floor panel, each of said respective seats having on each side of said seat, a forwardmost and a rearmost trough, said means for attaching said strap to said means for attaching seats comprising a hook adapted to fit around said pin within said trough.

8. The improvement of claim 7, wherein said plurality of straps comprise a first strap and a second strap on each side of said wheelchair or bulky item, the first strap on each side of said wheelchair or bulky item extending from a rearmost portion of said item to be positioned forward to said forwardmost trough, the second strap on each side of said wheelchair or bulky item extending from a frontmost portion of said item to be positioned rearward to said rearmost trough so that said first and second straps cross thereby providing a substantially horizontal positioning force component on each of said first and second straps when said means for adjusting the length of said straps is actuated thereby securely positioning said item to be position above said drop floor.

9. The improvement of claim 1 further comprising means for removably covering said drop floor so that a continuous surface approximately level with the level of said original floor panel is presented.

10. The improvement of claim 9, wherein said means for covering said drop floor comprises a substantially planar, rigid surface placed above said drop floor on said original floor panel.

11. The improvement of claim 10, further comprising means for positioning said means for covering said drop floor above said drop floor.

12. The improvement of claim 11 wherein said means for positioning said means for covering said drop floor comprises a protrusion, corresponding in size to said drop floor, extending downward from said means for covering said drop floor whereby an interaction between said protrusion and said means for connecting said drop floor to said original floor panel positions said means for covering said drop floor above said drop floor.

13. The improvement of claim 1 wherein said means for pulling comprises a winch.

14. An improvement in a vehicle such as a mini-van for transporting wheel chair bound people or large and bulky items each having a front and a rear, said mini-van having a front, a rear, and left and right outer edges and outermost left and right horizontal dimensions, said outer edges being the outermost left and right horizontal dimensions, respectively, of said mini-van, said mini-van having an original floor panel within said mini-van and at least a driver's seat, said, mini-van also including a frame including at least a pair of parallel frame pieces extending from said front of said mini-van to said rear of said mini-van, said frame pieces generally located toward said outer edges of said mini-van, said vehicle having a rear dropped axle, and a door openable to said rear of said mini-van, said improvement comprising:

(a) a drop floor, located below said original floor panel of said vehicle, said drop floor located between said frame rails of said vehicle and above said rear dropped axle of said vehicle, said drop floor extending from said rear of said mini-van into a passenger or cargo compartment of said vehicle, said drop floor ending behind said driver seat of said vehicle, said drop floor located below a cut-out section of said original floor panel corresponding in dimensions to said drop floor;

(b) means for connecting said drop floor to said original floor panel;

(c) a rear body piece having a cut-out portion corresponding in width to said drop floor and extending from said drop floor upward to an opening created by said rear door;

(d) a ramp pivotally connected to said drop floor at an edge of said drop floor at said rear of said vehicle, said ramp pivoting from a substantially vertical storage position within said vehicle to a functional position in contact with an external environment behind said vehicle through said cutout portion of said rear body piece thereby providing access for a wheeled item to said drop floor through rear body piece of said vehicle;

(e) means, attached to said original floor panel of said mini-van, for attaching seats within said mini-van to said original floor panel comprising a plurality of troughs recessed in said original floor panel and essentially level with said original floor panel, said troughs extending essentially parallel to said parallel frame pieces, said troughs including a pin extending across each of said troughs and located a distance above a lowermost portion of each of said troughs so that connectors on said seats corresponding to said troughs may be positioned around said pin within said trough thereby holding said seat in position above said original floor panel, each of said respective seats having on each side of said seat, a forwardmost and a rearmost trough, and wherein said means for attaching said strap to said means for attaching seats comprising a hook adapted to fit around said pin within said trough;

(f) means for securely positioning a wheel chair or other large bulky item upon said drop floor comprising a plurality of straps, each strap having a first end and a second end, said first end of said straps attached to the wheel chair or other large bulky item and having at said second end of each strap, means for attaching said strap to said means for attaching seats, said straps further having means for adjusting their respective lengths to tighten said straps thereby holding said wheel chair or said bulky item in position above said drop floor whereby said means for attaching seats within said mini-van may be used to attach seats within said mini-van for ordinary use and may also be used to attach said wheel chair or bulky item within either simultaneously with or in place of said seats;

(g) a first pulley attached to said rear dropped axle near said parallel frame piece closest to either said left or said right outer edge, said first pulley rotating around as axis parallel to said parallel frame pieces;

(h) a second pulley attached to said rear dropped axle near said parallel frame piece closest to the opposite said right or said left outer edge from said outer edge corresponding to said first pulley said second pulley rotating around an axis parallel to said parallel frame pieces; and (i) means attached to said mini-van substantially above said second pulley, for pulling a cable extending from said means for pulling around said second pulley, from said second pulley around said first pulley, and from said first pulley to an anchoring position on said mini-van substantially above said first pulley where said cable is securely fastened to said mini-van whereby said means for pulling pulls said cable causing said cable to be shortened, thereby drawing said parallel frame pieces towards said first and second pulleys thereby lowering said drop floor.

15. An improvement in a vehicle such as a mini-van for transporting wheel chair bound people or large and bulky items, said mini-van having a front, a rear, and, left and right outer edges and outermost left and right horizontal dimensions, said outer edges being the outermost left and right horizontal dimensions, respectively, of said mini-van, said mini-van having an original floor panel within said mini-van and at least a driver's seat, said mini-van also including means, attached to said original floor panel of said mini-van, for attaching seats within said mini-van to said original floor panel, said means for attaching comprising a plurality of troughs recessed in said original floor panel essentially level with said original floor panel, said troughs extending essentially parallel to said parallel frame pieces, said troughs including a pin extending across each of said troughs and located a distance above a lowermost portion of each of said troughs so that connectors on said seats corresponding to said troughs may be positioned around said pin within said trough thereby holding said seat in position above said original floor panel, each of said respective seats having on each side of said seat, a forwardmost and a rearmost trough, said means for attaching said strap to said means for attaching seat comprising a hook adapted to fit around said pin within said trough, and, said mini-van also including a frame including at least a pair of parallel frame pieces extending from said front of said mini-van to said rear of said mini-van, said frame pieces generally located toward said outer edges of said mini-van, said vehicle having a rear dropped axle, and a door openable to said rear of said mini-van, said improvement comprising:

(a) a drop floor, located below said original floor panel of said vehicle, said drop floor located between said frame rails of said vehicle and above said rear dropped axle of said vehicle, said drop floor extending from said rear of said mini-van into a passenger or cargo compartment of said vehicle, said drop floor ending behind said driver seat of said vehicle, said drop floor located below a cut-out section of said original floor panel corresponding in dimensions so said drop floor;

(b) side pieces connecting their respective left and right sides of said drop floor with corresponding sides of said original floor panel where said original floor panel has been cut out in corresponding dimensions to said drop floor;

(c) a front piece connecting an edge of said drop floor closest to said front of said mini-van to said original floor panel where said original floor panel has been cut out corresponding to the edge of said drop floor closest to said front of said mini-van;

(d) a rear body piece having a cut-out portion corresponding in width to said drop floor and extending from said drop floor upward to an opening created by said rear door;

(e) a rear bumper having a cut-out section above said drop floor and said cut-out portion of said rear body piece whereby removing the rear body piece and the rear bumper cut-out section located above said drop floor creates access to said drop floor through the rear of said vehicle;

(f) a ramp pivotally connected to said drop floor at an edge of said drop floor at said rear of said vehicle, said ramp pivoting from a substantially vertical storage position within said vehicle to a functional position in contact with an external environment behind said vehicle through said cut-out portion of said rear body piece thereby providing access for a wheeled item to said drop floor through said cut-out portion of said rear body piece of said vehicle;

(g) a first pulley attached to said rear dropped axle near said parallel frame piece closest to either said left or said right outer edge, said first pulley rotating around an axis parallel to said parallel frame pieces;

(h) a second pulley attached to said rear dropped axle near said parallel frame piece closest to an opposite said right or said left outer edge from said outer edge corresponding to said first pulley said second pulley rotating around an axis parallel to said parallel frame pieces;

(i) means attached to said mini-van substantially above said second pulley, for pulling a cable extending from said means for pulling around said second pulley, from said second pulley around said first pulley, and from said first pulley to an anchoring position on said mini-van substantially above said first pulley where said cable is securely fastened to said mini-van whereby said means for pulling pulls said cable causing said cable to be shortened, thereby drawing said parallel frame pieces towards said first and second pulleys thereby lowering said drop floor; and (j) means for securely positioning a wheel chair or other large bulky item upon said drop floor comprising a plurality of straps, each strap having a first and a second end, said first end of said straps attached to the wheel chair or other large bulky item and having at said second end of each strap, means for attaching said strap to said means for attaching seats, said straps further having means for adjusting their respective lengths to tighten said straps, said plurality of straps comprising at least a first strap and a second strap on each side of said wheel chair or bulky item, the first strap on each side of said wheelchair or bulky item extending from a rearmost portion of said item to be positioned forward to a forwardmost trough, the second of said straps on each side of said wheelchair or bulky item extending from a frontmost portion of said item to be positioned rearward to a rearmost trough so that said first and second straps cross thereby providing a substantially horizontal positioning force component on each of said first and second straps when said means for adjusting the length of said straps is actuated thereby securely positioning said item to be positioned above said drop floor.

16. The improvement of claim 15 further comprising means for removably covering said drop floor so that a continuous surface approximately level with the level of said original floor panel is presented.

17. The improvement of claim 16, wherein said means for covering said drop floor comprises a substantially planar, rigid surface placed above said drop floor on said original floor panel.

18. An improvement in a vehicle having a front, a rear, and left and right outer edges and outermost left and right horizontal dimensions, said outer edges being the outermost left and right horizontal dimensions, respectively, of said vehicle, said vehicle also including a frame including at least a pair of parallel frame pieces extending from said front of said vehicle to said rear of said vehicle, said frame pieces generally located toward said outer edges of said vehicle, said vehicle having a rear dropped axle, the improvement comprising a means for lowering said vehicle comprising:

(a) a first pulley attached to said rear dropped axle near said parallel frame piece closest to either said left or said right outer edge, said first pulley rotating around an axis parallel to said parallel frame pieces;

(b) a second pulley attached to said rear dropped axle near said parallel frame piece closest to an opposite said right or said left outer edge from said outer edge corresponding to said first pulley said second pulley rotating around an axis parallel to said parallel frame pieces; and, (c) means, attached to said vehicle substantially above said second pulley, for pulling a cable extending from said means for pulling around said second pulley, from said second pulley around said first pulley, and from said first pulley to an anchoring position on said mini-van substantially above said first pulley where said cable is securely fastened to said mini-van whereby said means for pulling pulls said cable causing said cable to be shortened, thereby drawing said parallel frame pieces towards said first and second pulleys thereby lowering said parallel frame pieces.

* * * * *